Figure 1:
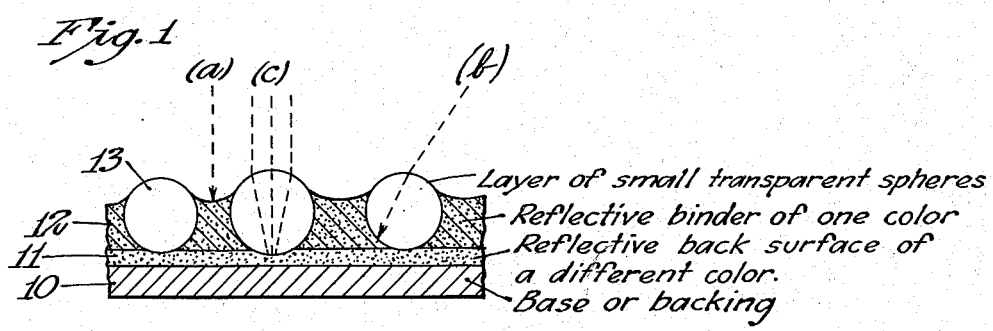

July 3, 1945.   P. V. PALMQUIST   2,379,741
REFLEX LIGHT REFLECTOR
Filed Jan. 23, 1943

Layer of small transparent spheres
Reflective binder of one color
Reflective back surface of a different color.
Base or backing Inventor
Philip V. Palmquist
By Carpenter, Abbott, Coulter & Kinney
Attorneys Patented July 3, 1945

2,379,741

UNITED STATES PATENT OFFICE 2,379,741

REFLEX LIGHT REFLECTOR

Philip V. Palmquist, New Canada Township, Ramsey County, Minn., assignor to Minnesota Mining & Manufacturing Company, St. Paul, Minn., a corporation of Delaware Application January 23, 1943, Serial No. 473,346

12 Claims. (Cl. 88—82)

This invention relates to "reflex" light reflectors of the class in which a layer of contiguous small transparent spheres or glass beads overlies light-reflecting means, being held in position by a binder, and serves as an interposed light refracting and collimating means so that an incident beam or ray of light is selectively returned toward the source as a brilliant cone of light, even though the incident light strikes at an angle. Highway signs of the reflex type have greater visibility at night, to the occupants of approaching vehicles, because less of the deflected light is dissipated outside of the field of viewing, the light being concentrated in a narrow cone which is substantially coaxial with the incident beam of light. The general properties of such beaded reflex reflectors which make for utility in signs and markers are discussed in my Patent No. 2,294,930, issued Sept. 8, 1942.

The present invention relates to structures where the daytime appearance, as viewed by diffuse day light, is different from the reflex reflecting night appearance when viewed by an observer located near the axis of an incident beam of light. Thus in the case of a highway sign, for example, an area may be made to appear white at night when viewed at a distance by an approaching motorist, although appearing yellow when viewed by day. This is accomplished by using external and internal reflective means of different reflective properties. The invention makes it possible to design signs which are of maximum effectiveness both by day and by night; the internal reflective means providing a desired type or color of reflex reflection and the external reflective means providing a desired type or color of external appearance.

The invention also relates to structures which provide multi-color reflex reflection by means of a plurality of internal reflecting means of different reflective properties. Thus, for example, an area of a highway sign may be made to appear white when viewed at a distance by an approaching motorist, with the appearance gradually changing through light yellow to deep yellow as the sign is approached. This feature may be combined with that mentioned in the preceding paragraph, in various ways, so as to secure various combinations of day and night appearance which are of value in designing highway signs and roadside advertising signs. In the latter connection, various novelties of appearance are made possible to excite interest and curiosity, and thus secure that attention and remembrance which are so much desired in the advertising field.

The nature of the invention can best be described in connection with the illustrative structures shown in the drawing, where:

Figs. 1, 2, 3 and 4 are magnified diagrammatic views of different reflex reflectors intended to bring out the structures rather than to serve as literal section views. Thus the spheres are spaced farther apart than is customary; and each circle represents a full circumference, which would not be the case in a true section since the spheres are not actually arranged in rows but are packed so that a section plane could not be passed through the centers of a series of adjacent spheres.

Referring to Fig. 1, there is shown in diagram form the structure of a beaded reflex reflector, having a base or backing 10 (which may be rigid or flexible) provided with a reflective surface 11. This reflective surface may be the surface of the backing itself, as where the latter is an inherently reflecting material, or may be formed by an applied sheet or coating which is reflective, such as a pigmented coating which is applied in liquid form and subsequently dries or hardens. This back reflective surface is covered by a reflective binder 12 which is pigmented to give the desired color reflectivity properties (in this sense a white pigmented binder is considered colored as well as binders which include such color pigments as yellow, orange, blue, green, etc.). A layer of contiguous small transparent spheres 13, such as glass beads, is partially embedded in the binder layer, before it dries or hardens, and is pressed down so that the spheres contact or slightly penetrate into the back reflective surface, the latter thus contacting the inner extremities of the spheres and providing reflection thereat. The binder layer is of such thickness that the outer extremities of the spheres are exposed to incident light, the binder extending somewhat above the mid-circumference of each sphere so as to firmly hold it in a socket, and being ordinarily higher on the sphere than between the spheres due to capillarity.

In accordance with this invention, the back reflective surface 11 and the reflective binder 12 differ in color reflecting properties. Thus, for example the former might be white and the latter might be yellow.

External reflection of incident light occurs at the exposed outer surfaces of the reflective binder, lying between the spheres, as illustrated by light ray $a$. In addition, rays incident upon the spheres at a substantial angle will be internally reflected by the reflective binder where it contacts the lower sides of the spheres to form a reflective spherical band or zone, as illustrated by light ray *b*. If this binder is yellow, for example, the reflector will appear yellow by day, being viewed by diffused sunlight, resembling an ordinary sign surface which is painted yellow. If the binder is white, the appearance will be white, etc. During the day, the surface of a sign area having a reflector structure of this type, illuminated by diffused daylight, thus has an appearance determined primarily by the color-reflecting properties of the reflective binder in which the spheres are embedded. The spheres are ordinarily a few thousandths of an inch (a few mils) in diameter and are not individually visible to the observer even when a relatively short distance away, so that the outer surface is relatively smooth and uniform and appears as though uniformly covered by a paint of the color of the binder, there being large numbers of spheres per square inch. Under day viewing conditions, the appearance is but little if any affected by the presence and color of the back reflective surface, owing to the minute size of the spheres.

Now consider the reflex reflecting characteristics, which are of importance when the reflector is illuminated by a beam of light with the observer being located near the axis of the beam, as occurs at night in the case of an automobile approaching a highway sign. In this case the feature of reflex reflection is that visibility exists even when the observer is so far away that he cannot see the reflected light which results from external reflection at the outer surface of the binder; such externally reflected light being diffused in all directions as in the case of an ordinary sign.

Suppose, first, that the sign is set vertically beside the road at substantially right angles to it, and that the approaching car is a great distance away, so that incident light rays impinge substantially normally to the plane of the sign, or have a relatively small angle of incidence. Paraxial rays of such a beam are illustrated by *c* in Fig. 1. The rays are refracted upon penetrating the convex surface of each sphere, so as to converge upon the back reflective surface 11 which underlies the inner extremity of the sphere.

The convergent rays striking reflective surface 11 are reflected and return as a divergent cone through the transparent sphere, and upon emerging are refracted so as to reduce the angle which they make with the optic axis. The emergent rays are largely concentrated in a cone coaxial with the incident rays and return toward the light source as a brilliant divergent beam, the degree of divergency depending upon the nature of the reflective surface and the refractive index of the spheres.

This phenomenon occurs even when the rays are incident at an angle, whence the designation "reflex." However, the limited aperture at the rear of the sphere, produced by the reflective binder, will pass only those incident rays which approach with a relatively small angle of incidence.

As the car approaches more closely to the sign, the angle of incidence increases until only a few rays can penetrate to the back reflective surface. But as the angle of incidence becomes relatively large, the rays striking each sphere will largely converge upon the concave surface of the reflective binder 12 which is in direct contact with the intermediate or lower side surfaces of each sphere, and will be reflected therefrom. This is illustrated by incident ray *b* in Fig. 1. These rays also will be reflexively reflected in a cone directed toward the light source.

Thus when a highway sign of this type is approached from a distance at night, the appearance of the reflex reflecting area will gradually change from that determined by the back reflective surface to that determined by the reflective binder, as the angle of incidence of the impinging light changes from relatively small to relatively large. Thus if the back reflective surface is white and the binder is yellow, the appearance will change from white to light yellow to the full yellow; while the day appearance will be yellow.

In the particular structure described and shown in Fig. 1, all internal reflecting surfaces contact the sphere surface. If the spheres are ordinary glass beads (refractive index about 1.50—1.55), and the reflective surfaces are non-specular, there will be considerable divergence of the cone of reflected rays returning toward the light source. This is advantageous for certain purposes for which a reflex reflector having smaller divergency properties would not be so suitable, because of the enlargement of the field of reflex viewing which the greater divergency produces (although at a sacrifice of maximum-distance visibility under conditions where a small divergency suffices to include the observer within the reflected cone of brilliant light). For example, take the case of a roadside advertising sign set back from the road and at an angle to it, and which is illuminated at night by fixed lights directed toward it. When observed from a car approaching along the road, the illumination is provided primarily or almost entirely by said fixed lights rather than by the headlights of the car, and the eyes of the occupant of the car will be considerably away from the axis of incident light impinging on the spheres. Here the relatively large divergency of the reflected light causes the occupants of the car to see the reflex reflecting areas of the sign by the internally reflected light, as well as by such light as is externally reflected and of sufficient intensity to increase the over-all brilliancy. Such sign will appear very definitely brighter than it would if it were an ordinary painted sign. Moreover, as the sign is approached, the angle of reflex reflected light reaching the observers' eyes will change and the color appearance will change, depending on the relative contributions of light reflected from the binder at the sides of the beads and that reflected from the back reflective surface, so that the multi-color characteristic is utilized to produce an effect which attracts attention, interest and curiosity—which are highly desirable attributes of advertising signs.

The divergence of the reflex reflected light can be reduced by using spheres of higher refractive index, the optimum being reached when the index is about 1.80—1.90. Moreover, when spheres having a refractive index of about 1.65 or higher are used, the brilliancy can further be increased by employing reflective surfaces which are specular or semi-specular. Thus the back reflective surface may be an aluminum foil, or an aluminum paint in which the aluminum flakes lie approximately parallel to the surface, producing "silvery" reflection of light incident thereon. This will result in maximum-distance visibility in the case, for example, of a highway traffic sign set at approximate right angles to the highway and which is illuminated by the headlights of approaching vehicles.

In general, it is desirable for the back reflective surface to be of the white or metallic type, to secure maximum reflection and minimum absorption of light, making for visibility at the greatest distance. However, in the case of advertising signs, to provide novelty and attract interest, a colored back reflector may be combined with a binder having a different color. Thus the back surface might be yellow and the binder might be red, so that the appearance will gradually change from yellow through orange to red as the sign is approached. To increase reflection, light tones may be used, as by including white pigment with the colored pigment. A further illustration is a yellow back reflector combined with a light blue binder (white pigment being included in the latter to increase reflectivity); which will result in the sign area changing from yellow through green to blue as the sign is approached.

Figure 2:
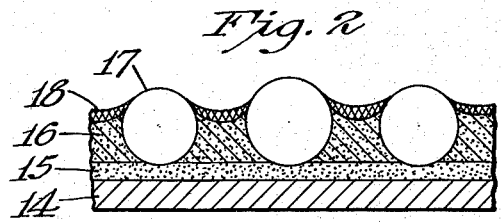

Fig. 2 shows a structure including, as before, a base or backing 14 having a reflective surface 15 covered by a reflective binder layer 16 in which the layer of small transparent spheres 17 is partially embedded and touches or slightly penetrates the underlying reflective surface. Additionally, there is provided an external colored surface 18 on the outer surface of the binder layer, and lying between the outer, exposed, extremities of the spheres, and which is dissimilar in color reflecting properties. Thus when back reflective surface 15, reflective binder 16 (which now serves only as an internal reflector where it contacts the sides of the spheres), and the outer, external, colored surface 18, are all different in color, three different effects are produced. The night reflex appearance will be determined by the color properties of the back reflective surface and the binder layer, as described in connection with Fig. 1, while the outer colored surface 18 permits of a different day appearance. As this outer colored surface is located above the level of the sphere centers, extending between the outer extremities of the spheres, it does not affect internal reflex reflection, but merely the external appearance. It need not be reflective. A black surface produces a black appearance because of absence of reflection, i. e. its reflective characteristic is to absorb rather than reflect; whereas a yellow surface absorbs some rays and reflects others; and a white surface reflects rays of all colors. Black and white surfaces are both referred to as "colored" in a broad sense, since color contrasts are involved as regards the effects produced by the various surfaces which light may impinge upon in the reflector structure.

Thus this structure permits of providing a black day appearance without interfering with night reflex reflecting properties. This is often desirable in a sign, i. e. it is often desired to provide letters or other indicia which are black when the sign is viewed by day, to secure high visibility against a particular background, but which will be reflex reflecting at night for maximum visibility under night conditions. Hence this structure permits of selecting a day appearance and a night appearance which are independent and each can be chosen to produce the desired effect.

In the Fig. 2 type of structure, the back reflective surface 15 and the reflective binder 16 may have the same color, i. e., both may be white or both yellow, etc., so that all reflex reflection will be the same. This is equivalent to embedding the spheres in a reflective binder which surrounds the inner extremities of the spheres. The outer colored surface 18 is employed to produce a different day appearance as, for example, if the night reflex appearance is yellow, a black day appearance, produced by using a black outer surface, provides the contrast between day and night appearance.

The colored surface 18 may be provided in various ways, either as a step in the manufacture of the reflex reflector or at a subsequent time by a sign maker or other use, and may extend over the whole area or over particular areas only (as in making letters or other indicia). A colored coating composition may be applied over the surface and after it has dried or hardened, or partially so, the surface of the reflector may be scrubbed or buffed to remove the composition from the outer extremities of the spheres, but leaving it between the spheres as shown in Fig. 2. Another expedient is to apply a dry pigment or color powder to the surface before the binder 16 has dried (that is, while still tacky), or if the binder is dry it may be softened with a solvent, the color material thus adhering to the binder surface but not to the sphere surfaces. Such coloring material may be blown under pressure so as to cause better embedding and a thicker coating, or the reflector may be vibrated to cause the color material to settle into the binder surface. This expedient may be employed even though the binder is "colored." A black coloring material, such as carbon black, or finely divided black sand or mineral, may be effectively applied over any binder. In any case, by using a highly opaque coloring material and forming a good layer, interference will be avoided. A fluorescent or phosphorescent powder may be applied to the surface in this way.

In some cases, it may be desirable to employ a surface coloring material which permits of some light penetration to the binder so that both contribute to the color appearance—as for example a translucent blue coloring pigment over a yellow binder would give a greenish-blue appearance. A dyed resin coating can be used over a white binder to produce the color appearance of the dye, or if applied over a binder of different color to produce an appearance determined by the combined effect.

A dye solution may be applied to directly dye the surface zone of the binder; that portion which covers the extremities of the spheres being subsequently removed.

Figure 3:
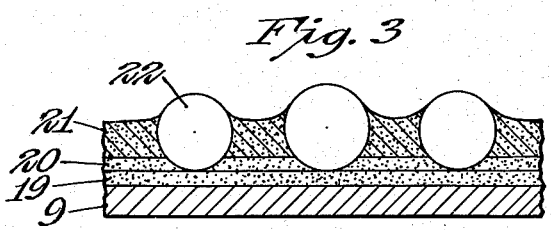

Fig. 3 shows a structure having a base or backing 9, an overlying reflective layer 19 which serves as a presize to prevent the spheres from touching the base or backing, and which may be a white pigmented coating which is allowed to dry or harden before the binder layer is applied; over which is applied reflective layer 20—21 in which the spheres 22 are partially embedded and pressed down to the surface of layer 19. Layer 20—21 may be unitary, i. e. applied as a single coating; or may be formed of two strata 20 and 21 which are applied successively and may differ in color, so that layers 19 and 20 have one color (such as white) and layer 21 has a different color (such as yellow), the latter layer being exposed at the surface and providing a day appearance different from the night reflex appearance produced by internal reflection of light from the internal surfaces of layers 19 and 20 which contact the inner extremities of the spheres, and layer 21 also providing reflex reflection of highly angular incident rays to produce a reflex appearance which is different.

When binder layer 20—21 is unitary in the sense of being formed of one coating, it may be transformed so as to have a different color in its upper stratum 21 than in its lower stratum 20. This may be done by contacting a dye solution with the surface of the reflector for a sufficient time to penetrate to the necessary depth, that is so as to dye the layer to below the middle of the spheres to provide a colored reflective band or zone extending down around the lower side portion of each sphere, as indicated in Fig. 3 by stratum 21. Thus, for example, layer 19, and layer 20—21, may each be a white pigmented coating composition, so that the reflex reflector initially appears white both by day and night; and a green dye solution is applied to the outer surface (as by soaking the reflector in a bath thereof) so as to cause stratum 21 to become green, any dye adhering to the outer extremities of the spheres being subsequently removed. Layer 19 and stratum 20 remain white. When layer 20—21 is thus applied as one coating, it should be sufficiently absorptive or porous toward the dye solution to permit of penetration. Somewhat better control can be obtained by successively applying two distinct coatings to form distinct layers 20 and 21, layer 21 being absorptive of the dye solution and layer 20 being compounded so as to be relatively non-absorptive, thus limiting the extent to which the dye can penetrate.

Figure 4:
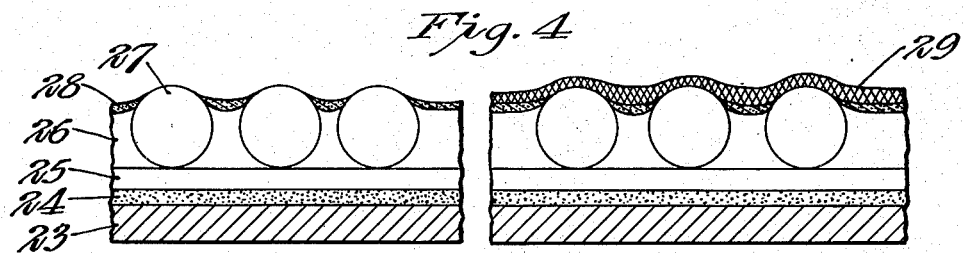

Fig. 4 shows a reflex reflector involving a so-called "spaced" structure, which is in one sheet but having a particular area or areas covered over entirely to mask out reflex reflection thereat, and is used to illustrate effects which can be obtained in sign making. The left part of the drawing shows an area in which the outer extremities of the spheres are left exposed, while the right part shows an adjacent area of the same reflex reflector sheet in which the whole surface area has been covered over.

The base or backing 23 has a reflective surface 24 over which is applied a transparent spacing layer 25, having a thickness of 20–50% of the average sphere diameter when ordinary glass beads are used. This may be cast in situ, using a transparent film-forming coating composition which is dried or hardened before the subsequent coating operation. There is next applied a transparent binder coating 26 in which the spheres 27 are partially embedded so that their lower extremities touch spacing layer 25, the transparent binder being of a thickness so that it extends above the middle of the beads, leaving the outer extremities exposed. The binder is then hardened or dried so that the spheres are held in positive, predetermined, controlled, spaced relation from back reflective surface 24, by the transparent matrix provided by layer 25 and binder 26. Examples of suitable coating compositions are given in my Patent No. 2,294,930, issued Sept. 8, 1942. Said patent describes a specific structure of the foregoing general type, wherein glass cullet or small glass beads are included between the refracting spheres and the back reflective surface, as a spacing means, and such structure may be employed in the present connection, the same result being obtained.

A colored surface 28 is then provided for external appearance, lying between the sphere extremities. This may be formed in ways previously described, as by applying a colored coating and subsequently removing portions which cover the bead extremities, or by applying dry pigment or color powder to the surface of the transparent binder before the latter has dried to a non-tacky state.

In this structure all internal reflex reflection is from the back reflective surface 24, which controls the night reflex appearance. The day appearance is controlled by the outer or external colored surface 28, which appears like a pain uniformly covering the surface, due to the minute size of the spheres. As an example, the back reflective surface may be a semi-specular aluminum flake type, giving a high-brilliancy reflex reflection of "silvery" appearance at night, while the outer colored surface 28 may be white to give a white day appearance, yellow to give a yellow day appearance, or black, etc.

Referring to the right-hand part of Fig. 4, an area of the reflex reflector which has just been described, may be covered over with a painted or printed colored coating 29, which covers over the spheres as well as the colored surface 28, as the small size of the spheres permits of a relatively smooth and uniform outer surface which lends itself to painting and printing over the layer of spheres. In making a sign, this may represent surrounding background to define the boundaries of reflex reflecting letters or indicia; or conversely, the letters or indicia may be painted or printed, being surrounded by a reflex reflecting background. In the normal case, colored coating 29 will be distinctly different in color appearance from color surface 28 so as to provide proper contrast for delineating the letters or indicia of the sign.

However, various novel effects can be produced which are of value in making advertising signs. Thus layer 29 and surface 28 can be of the same color, so that the whole area has the same day appearance and no letters or indicia are visible, whereas at night reflex reflecting letters or indicia will stand out (represented by the left-hand part of Fig. 4). This can be accentuated by using non-reflective surfacings, such as black, for 28 and 29, so that a background (right-hand part of Fig. 4) is provided which is not even externally reflecting and is dark even when the sign is viewed at close range. Thus in a highway advertising sign there can be a black band or margin which is effectively worked into the design from the day appearance standpoint, within which luminous letters or insignia "mysteriously" appear when viewed at night. This may convey a "night message"—as, for example, night telephone rates in a telephone company's advertising sign. This expedient may also be employed in making highway speed limit signs, where the night limit is different than the day limit, so as to make the night limit automatically appear to motorists when darkness comes and headlights are put on. This effect is not of course limited to beaded reflex reflectors having the internal structure shown in Fig. 4.

As a further example of novel advertising sign effect which can be obtained with the present invention, a sign may be made in which the whole of a particular area is reflex reflecting and has the same day appearance, but a part or parts of the area is formed of a reflex reflector sheet having one color of night reflex appearance while the remainder of the area (or a part) is formed of a reflex reflector having a different night reflex appearance. That is, the back reflective surfaces have different color reflecting properties (being, for example, white and yellow, respectively) to produce differentiated night reflex appearance, whereas the external top colored surfacing in each case may be the same as one of the back reflective surfaces or may be different from either of the back reflective surfaces but the same as each other. Thus at night, the reflex appearance may be white letters against a yellow background, while by day the whole area appears one color and the letters are not seen.

It will be evident that numerous different combinations are possible in sign making so that a wide variety of color effects and special novelty effects can be obtained by using the principles of the present invention. While a number of illustrations have been set forth, no attempt has been made to describe all possible combinations and permutations.

My Patent No. 2,294,930, issued Sept. 8, 1942, describes various backings, backing treatments, and colored and transparent coating compositions, which may be used in constructing beaded reflex reflector signs and sheets, including flexible and weatherproof sheets that can be manufactured in continuous web form, conforming to the structural types herein set forth. Hence it is considered unnecessary to enter into a detailed description thereof. The following examples of compositions and procedures are given merely by way of illustration:

EXAMPLE 1

The following illustrates the making of a reflex reflector of the type shown in Fig. 1, wherein the reflective back surface 11 is a smooth, dense, white enamel coating which will not absorb color from the subsequently applied reflective binder 12.

The base or backing 10 may be a rigid sign base of metal or plywood; or may be a flexible sheet material, such as paper which has been impregnated with a waterproofing filler, or may be a flexible organic film such as a film of a synthetic rubbery material.

The white enamel coating composition has the following formula in parts by weight:

Part I

½ Sec. nitrocellulose solution (80% solids, 20% ethyl alcohol) _____ 22
Ethyl Cellosolve (ethyleneglycol monoethyl-ether) _____ 44
Hydrosolvent No. 2 _____ 21

Part II

"Rezyl 53" _____ 46
"Lindol C" (tricresyl phosphate) _____ 6
"Titinox A" (titanium dioxide pigment) ____ 31
Hydrosolvent No. 2 _____ 15
Ultramarine blue (white intensifier) _____ Trace The "Rezyl 53" is a liquid alkyd resin composition sold by American Cyanamid Co., composed of 65% of a two-component type alkyd resin and 35% of a plasticizer of the non-drying oil or non-drying fatty acid type.

The Hydrosolvent No. 2 is a volatile petroleum solvent which is aromatic in character. It can be substituted for by benzol or toluol or mixtures thereof.

Part I is mixed together until a clear solution is obtained.

Part II is combined together in a paint mill so as to fully work in and disperse the pigment.

Parts I and II are then combined in a paint mixer.

The resultant white enamel is coated on the base or backing and, being of the solvent drying type, will set up at room temperature in about an hour, or at 160° F. in 15 minutes. It is soft even when fully dried, thus permitting the spheres to penetrate so as to be contacted by it at the lower extremities.

An example of a yellow reflective binder composition is:

"Rezyl 53" _____ 200
"Beetle 227-8" _____ 100
Hydrosolvent No. 2 _____ 30
Lead chromate yellow pigment_____ 300

The "Beetle 227-8" is a 50% solution of urea-formaldehyde resin in a solvent composed of 60 parts butyl alcohol and 40% xylol, and is also sold by American Cyanamid Co. It is a thermosetting resin and causes the coating to set up at moderate temperatures.

This yellow coating may be applied hot (150° F.), to be of a thickness such as previously described in connection with Fig. 1, and may be applied before coating 11 has fully dried.

Small glass spheres or beads are then coated over the surface, the excess removed, and a roller used to press the beads down through the yellow binder and somewhat into the white reflective layer.

This yellow binder can be cured at 225° F. in 1 hour, or at 175° F. in 16 hours.

Other colors of the binder can be secured by substituting other pigments for the yellow.

A suitable glass bead size is No. 10; such beads having a diameter in the range of about 5 to 8 mils. These small beads provide a surface which is relatively smooth and uniform and readily permits of painting or printing thereover in making signs (to form non-reflex colored areas for delineation of letters or insignia).

The foregoing may be employed in making signs, or flexible reflex reflector sheeting for use in making signs, which are weatherproof and will stand at least one year of outdoor exposure without material deterioration.

EXAMPLE 2

The following illustrates a color composition adapted for applying over the beaded surface of a reflex reflector to obtain a colored surface coating between the extremities (such as 18 in Fig. 2 and 28 in Fig. 4).

"Beetle 227-8" _____ 100
"Rezyl 53" _____ 200
"Titinox A" _____ 500
Ethyl Cellosolve _____ 315
Hydrosolvent No. 2 _____ 50

Various colored pigments can be substituted in whole or in part for the white Titinox. A good black coating can be made by substituting 10 to 15 parts carbon black for the Titinox.

When such coating composition is applied, using a roll coater, it is squeezed down between the beads and but little covers the top extremities thereof. It may be cured at 212° F. for 2 hours. The surface is then wet with water, which causes the coating film or skin on top of the beads to loosen and it can be readily removed by brushing or buffing.

EXAMPLE 3

This illustrates a white binder which is absorbent to permit of dyeing from the surface as explained in connection with Figs. 2 and 3.

n-Propyl-methacrylate resin (a hard transparent resin) _____ 100
"Titinox A" _____ 200
Hydrosolvent No. 2 _____ 200

Alcohol-soluble dyes can be used, such, for example, as "Luxol Fast Red B" (red), or "Luxol Fast Blue MBS" (blue), which are light-fast dyes made by the E. I. du Pont de Nemours Company. These are applied in an alcohol solution and dye the resin component of the binder, and thereby color the binder. The depth of penetration from the surface of the binder depends on the length of exposure.

Having described various illustrative embodiments of the invention, but without intent to be limited thereto, what is claimed is as follows:

1. In a flexible reflex reflector sheet material adapted for use in making outdoor signs, a layer of contiguous small transparent spheres, underlying internal light-reflecting means adapted to provide reflex reflection of a beam of light incident upon the spheres, binder means for holding the spheres in position, and external surface material between the exposed extremities of the spheres which has light reflective properties different from the aforesaid internal light-reflecting means such that the day appearance produced thereby is of different color from the night reflex appearance produced by said underlying internal reflecting means.

2. In a flexible reflex reflector sheet material adapted for use in making outdoor signs, a flexible back reflector, an overlying layer of small transparent spheres, and a reflective binder in which said spheres are partially embedded so that a reflecting spherical band or zone is provided around the lower side of each sphere to provide internal reflection of highly angular incident rays, the inner extremities of the spheres being clear thereof to permit light rays having a small angle of incidence to strike said back reflector, said back reflector and reflective binder being dissimilar in color reflecting properties so that the reflex reflecting appearance changes as the incident light angle varies from relatively small to relatively large.

3. In a flexible reflex reflector sheet material adapted for use in making outdoor signs, a back reflector, an overlying transparent matrix, a layer of small transparent spheres partially embedded therein and held in spaced relation out of contact with said back reflector, and an overlying opaque surfacing material lying between the outer extremities of the spheres so as to determine the day appearance, the reflex internal reflection being exclusively from said back reflector.

4. A sign or marker having a reflex reflecting area comprised of a layer of small transparent spheres, a binder for said spheres, underlying reflective means for producing reflex reflection of a light beam striking the spheres, an opaque colored material exposed externally between the outer extremities of the spheres and which renders the day appearance of the area dissimilar in color to the night reflex appearance produced by said underlying reflective means; said area having an area adjacent thereto whose surface is continuously colored over to conform to the exposed colored material of the first-mentioned area, so that both areas appear the same by day but only the first-mentioned area is reflex reflecting at night.

5. A sign or marker having a plurality of reflex reflecting areas each comprised of a layer of small transparent spheres, a binder for said spheres, underlying reflective means for producing reflex reflection of a light beam striking the spheres, and an opaque colored material exposed externally between the outer extremities of the spheres which determines the day appearance and which is the same in each case so that all of said areas have the same day appearance; said underlying reflective means being different in color reflective properties in different areas so that such areas have dissimilar color appearances at night and are differentiated when viewed by light reflexively reflected from said underlying reflective means.

6. A reflex light reflector sheet adapted for use as a sign or marker, comprising a back reflector, an overlying transparent matrix, a layer of contiguous small transparent spheres partially embedded in the transparent matrix and thereby held in spaced relation out of contact with the back reflector, and an overlying opaque surfacing material lying solely between the outer extremities of the spheres so as to determine the day appearance of the reflector sheet, the reflex internal reflection being exclusively from said back reflector spaced behind the spheres; there being a large number of spheres per square inch so as to permit of a relatively smooth and uniform outer surface which lends itself to painting and printing over the layer of spheres.

7. A reflex light reflector sheet according to claim 6 in which the back reflector is of the silvery metallic type having a specular reflectance characteristic so as to produce long range visibility at night by reflex reflection, and the opaque surfacing material is reflective and colored and has a non-specular reflectance characteristic.

8. A reflex light reflector sheet according to claim 6 in which the opaque surfacing material is predominately light-absorptive so as to be poorly reflective and dark colored.

9. A reflex light reflector sheet according to claim 6 in which the opaque surfacing material is black so that the reflector sheet appears black by day but luminous by night when viewed under reflex reflecting conditions.

10. A reflex light reflector sheet adapted for use as a sign or marker, comprising a single layer of contiguous small transparent spheres, a binder matrix in which aid spheres are partially embedded and underlying reflective means in optical connection with the inner extremities of said spheres, and dye material impregnated into the binder matrix from the outer surface thereof to an extent such that it lies above the inner extremities of said spheres, the dye producing a different color than that of the underlying reflective means and thereby causing the light reflector sheet to have a day color appearance different from the night reflex appearance produced by reflection of incident light from the reflective means underlying the inner extremities of said spheres; there being a large number of said spheres per square inch so as to permit of a relatively smooth and uniform outer surface which lends itself to painting and printing over the layer of spheres.

11. A reflex light reflector sheet according to claim 10, wherein the dye material extends from the surface of the binder down to below the middle of the spheres to provide a colored band extending around the lower side portions of the spheres but above the inner extremities thereof.

12. A multi-color reflex light reflector sheet adapted for use as a sign or marker, comprising a light-returning layer of contiguous small transparent spheres held in position by coated binder means, internal light-reflecting means underlying said spheres and in optical connection with the inner extremities thereof to produce reflex reflection of a beam of incident light passing through the spheres, and external coloring material located between but not covering the outer extremities of said spheres and differing in color-imparting properties from said underlying light-reflecting means such that by day the reflector sheet appears as though continuously coated with paint of one color due to said external coloring material and by night reflex reflection appears as though continuously coated with paint of a different color; there being a large number of spheres per square inch so as to produce the simulated continuous paint appearance.

PHILIP V. PALMQUIST.